(No Model.)
W. H. FLINN.
TOOL FOR CUTTING SHEET METAL AND WIRE.
No. 472,210. Patented Apr. 5, 1892.
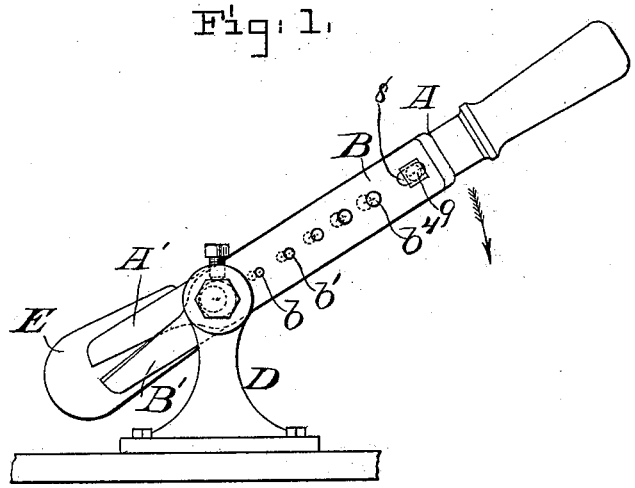
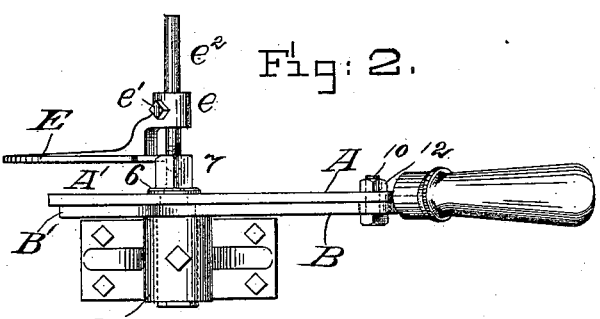
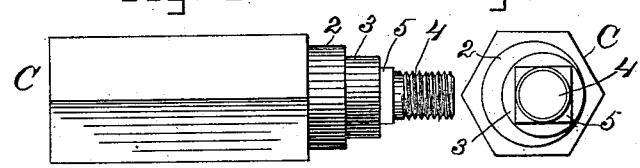
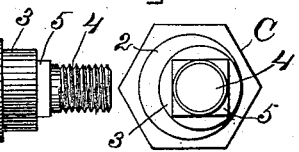
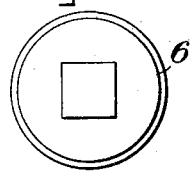
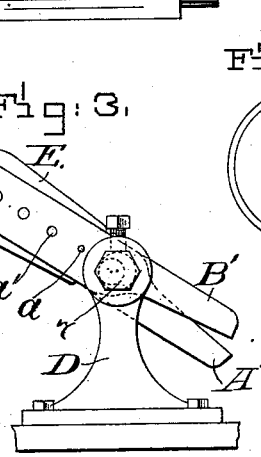
Witnesses:
Oscar F. Hill
Edward F. Allen.
Inventor:
William H. Flinn
by Crosby & Gregory
Attys.

UNITED STATES PATENT OFFICE.

WILLIAM HENRY FLINN, OF NASHUA, NEW HAMPSHIRE.

TOOL FOR CUTTING SHEET METAL AND WIRE.

SPECIFICATION forming part of Letters Patent No. 472,210, dated April 5, 1892.

Application filed June 29, 1891. Serial No. 397,830. (No model.)

*To all whom it may concern:*

Be it known that I, WILLIAM HENRY FLINN, of Nashua, county of Hillsborough, State of New Hampshire, have invented an Improvement in Tools for Cutting Sheet Metal and Wire, of which the following description, in connection with the accompanying drawings, is a specification, like letters and figures on the drawings representing like parts.

This invention has for its object the production of a novel tool or implement for shop use and by which sheet metal or wire may be readily cut.

This invention is an improvement upon that described in United States Patent No. 327,153, granted to me September 29, 1885.

Figure 1 in side elevation represents one of my improved tools or implements adapted for use as shears for cutting sheet metal; Fig. 2, a top or plan view thereof. Fig. 3 shows the tool or implement reversed on its fulcrum to adapt it for cutting wire. Fig. 4 shows the fulcrum-stud for the bars or levers employed; Fig. 5, a right-hand-end view of the fulcrum-stud shown in Fig. 4. Fig. 6 represents the washer detached.

My improved implement consists, essentially, of two blades or bars A B, one of which has a suitable handle or end piece, each blade having, however, a shear-like extremity, as A' B', the said blades being mounted side by side on a fulcrum-stud C, having bearings 2 3, one of which is eccentric to the other, as best shown in Fig. 5. The stud C has preferably a square shoulder 5 and a threaded end 4, and preferably the body of the stud will be made hexagonal or many-sided in cross-section, so that it may be firmly held in a correspondingly-shaped hole or bearing in a suitable stand, as D, adapted to be suitably bolted or confined to a bench or table, or the projecting end of the said stud may be readily grasped between the jaws of a vise. The gage E has its hub $e$ adjustably attached by a set-screw $e'$ to a rod $e^2$, herein represented as tapped into a nut 7, (see Fig. 2,) which nut comes against the washer 6, fitted on the shoulder 5 of the stud C, and keeps the two blades or bars A B, respectively, upon the bearings 2 and 3 of the stud, the bearing 3 being eccentric to the bearing 2, so that as the said blades or bars are vibrated in one or the other direction about the said fixed bearings the blades will be moved one relatively to the other, as will be described. The blade B is slotted, as at 8, (see Figs. 1 and 3,) to receive a bolt 9, which is extended through a hole in the blade A, which is of substantially the diameter of the bolt, a nut 12 holding the said bolt in place. The blades A and B are provided, respectively, with a series of holes $a\ a'\ b\ b'$, of varying diameter, for the reception of wires of different gage or number.

For use as a shears the stud C will be firmly mounted in a stand D or otherwise in such a position as to leave the two bearings in substantially the position shown in Fig. 5, and the normal condition of the handle will be as represented in Fig. 1, and the handle will stand at that side of the longitudinal center of the stud C where the bearings are of greatest eccentricity. In such condition, by depressing the bars or blades A B in the direction of the arrow, Fig. 1, the eccentric 3, as the lever B travels about the concentric bearing 2, will cause the blade or bar A to slide transversely with relation to the blade B, which will cause the blades of the shears to close or shut up with relation to each other, so that the said shears will cut sheet metal or other material put between them.

To employ the implement or tool as a wire-cutter, the blades will be turned over into the position Fig. 3, or placing the handle part at the other side of the eccentric, and in this condition the holes $a\ a'\ b\ b'$, &c., of the same size will register one with the other for the insertion of a wire through both blades, and then by turning both blades in the direction of the arrow in Fig. 3 the eccentric will cause the blade A to travel longitudinally with relation to the blade B, and, sliding one on the other, the wire placed through the holes in both blades will be cut off squarely at the points where the faces of the blades contact, substantially as in the patent referred to. The mere reversal of the handle from the positions Fig. 1 to Fig. 3 will change the implement from a shear cutter to a wire-cutter, and vice versa. When the device is to be used as a wire-cutter, then the gage will be turned half-way round from the position Fig. 1 to the position Fig. 3, especially if the pieces of wire to be cut off are to be cut to a specific length. The extent of movement imparted to the blade A with relation to the blade B will vary more or less, according to the difference in size between the eccentric-bearing 3 and the concentric 2.

Having described my invention, I claim—

1. The herein-described combined shears and wire-cutter, consisting, essentially, of two blades or bars having shear-like extremities and provided with holes for the reception of wire, and an eccentric-bearing for one of the said bars, substantially as described.

2. A stud, bearings 2 and 3, one being eccentric with relation to the other, combined with two levers or blades having shear-like extremities and mounted, respectively, upon the said bearings 2 and 3, rotation of the levers in unison causing the shear-like extremities to open and close, substantially as described.

3. The bearing-stud having bearings 2 3, one eccentric with relation to the other, the levers A B, mounted thereon, each provided with a series of holes and with shear-like extremities, and a bolt 10, held in one of the said blades and extended loosely through the other, combined with a gage and means to support it, to operate substantially as described.

In testimony whereof I have signed my name to this specification in the presence of two subscribing witnesses.

WILLIAM HENRY FLINN.

Witnesses:
F. S. SARGENT,
J. B. TILLOTSON.